(12) United States Patent
Eckert et al.

(10) Patent No.: US 7,835,734 B2
(45) Date of Patent: Nov. 16, 2010

(54) SYSTEM AND METHOD FOR WIRELESS ROUTING OF DATA FROM AN AIRCRAFT

(75) Inventors: Richard J. Eckert, Peoria, AZ (US);
Adam C. Prewett, Shoreline, WA (US)

(73) Assignee: Honeywell International Inc., Morristown, NJ (US)

( * ) Notice: Subject to any disclaimer, the term of this patent is extended or adjusted under 35 U.S.C. 154(b) by 659 days.

(21) Appl. No.: 11/858,673

(22) Filed: Sep. 20, 2007

(65) Prior Publication Data
US 2009/0082013 A1  Mar. 26, 2009

(51) Int. Cl.
*H04Q 7/20* (2006.01)

(52) U.S. Cl. .................... 455/431; 455/550.1; 455/445; 340/945; 701/33

(58) Field of Classification Search ................ 455/431, 455/550.1, 445; 340/945; 701/33
See application file for complete search history.

(56) References Cited

U.S. PATENT DOCUMENTS

| | | | |
|---|---|---|---|
| 4,901,307 A | 2/1990 | Gilhousen et al. | |
| 6,047,165 A | 4/2000 | Wright et al. | |
| 6,108,539 A | 8/2000 | Ray et al. | |
| 6,154,636 A | 11/2000 | Wright et al. | |
| 6,160,998 A | 12/2000 | Wright et al. | |
| 6,163,681 A | 12/2000 | Wright et al. | |
| 6,173,230 B1 | 1/2001 | Camus et al. | |
| 6,181,990 B1 | 1/2001 | Grabowsky et al. | |
| 6,195,189 B1 | 2/2001 | Nishihata et al. | |
| 6,259,379 B1 | 7/2001 | Paterson et al. | |
| 6,308,044 B1 | 10/2001 | Wright et al. | |
| 6,438,468 B1 | 8/2002 | Muxlow et al. | |
| 6,477,152 B1 | 11/2002 | Hiett | |
| 6,677,888 B2 | 1/2004 | Roy | |
| 6,788,935 B1 | 9/2004 | McKenna et al. | |
| 6,795,408 B1 | 9/2004 | Hiett | |
| 6,816,728 B2 | 11/2004 | Igloi et al. | |
| 6,915,189 B2 | 7/2005 | Igloi et al. | |
| 6,965,816 B2 | 11/2005 | Walker | |
| 6,990,319 B2 | 1/2006 | Wright et al. | |
| 2003/0003872 A1 | 1/2003 | Brinkley et al. | |
| 2004/0160340 A1* | 8/2004 | Thomson et al. ............ | 340/945 |
| 2004/0235469 A1 | 11/2004 | Krug | |
| 2005/0026609 A1 | 2/2005 | Brinkley et al. | |
| 2005/0143013 A1 | 6/2005 | Jha | |

(Continued)

OTHER PUBLICATIONS

Carlos Jodar et al., "WI-FI Gatelink Trial Frankfurt and Muich, Germany White Paper", Aug. 9, 2006, pp. 1-18, Publisher: Arinc Proprietary.

(Continued)

*Primary Examiner*—Danh C Le
(74) *Attorney, Agent, or Firm*—Fogg & Powers LLC

(57) ABSTRACT

An avionics communication system comprises a wireless router located on an aircraft and configured to transceive wireless signals; and a processing unit located in the aircraft and configured to supply the wireless router with configuration parameters after determining it is time to connect to a ground network, the configuration parameters based on the location of the aircraft; wherein the wireless router uses the configuration parameters to establish a wireless connection with the ground network and route data from at least one client application on the aircraft to at least one ground application server.

20 Claims, 3 Drawing Sheets

U.S. PATENT DOCUMENTS

| | | | |
|---|---|---|---|
| 2005/0221814 A1 | 10/2005 | Fagan et al. | |
| 2005/0286452 A1 | 12/2005 | Hardgrave et al. | |
| 2006/0031394 A1 | 2/2006 | Tazuma | |
| 2006/0080451 A1 | 4/2006 | Eckert | |
| 2006/0178141 A1 | 8/2006 | McGuffin et al. | |
| 2007/0184846 A1* | 8/2007 | Horton et al. | 455/456.1 |
| 2007/0264999 A1* | 11/2007 | Radpour | 455/431 |
| 2007/0281705 A1* | 12/2007 | Bosenbecker | 455/445 |
| 2008/0039076 A1* | 2/2008 | Ziarno et al. | 455/431 |
| 2008/0086554 A1* | 4/2008 | Royalty | 709/224 |

OTHER PUBLICATIONS

Eklund et al., "IEEE Standard 802.16: A Technical Overview of the Wirelessman Air Interface for Broadband Wireless Access", "IEEE Communications Magazine", Jun. 2002, pp. i-107, Publisher: IEEE.

Hardy et al., "Aircraft Network and File Server—ARINC 763", Oct. 16, 2002, pp. 1-12, Publisher: AEEC (Airlines Electronic Engineering Committee).

"Technical Overview for Mark III Communications Management Unit (CMU)",, pp. 1-59, Publisher: Honeywell Aerospace Electronic Systems, Jul. 2002.

Hurlburt et al., "A Data Communications Concept For a Sats Scenario", "4th Integrated CNS Technologies Conference and Workshop", Apr. 2004, pp. 1-20.

Ivancic, "Modular, Cost-Effective, Extensible Avionics Architecture For Secure Mobile Communications", "2006 IEEE Aerospace Conference—Mar. 4-11, 2006 Big Sky, Montana", 2006, pp. 1-9, Publisher: IEEE.

Teledyne Technologies Inc., "Wireless GroundLink System (WGL)", www.teledyne-controls.com/productsolution.wirelessgroundlink.groundlink.asp, 2007, pp. 1-2, Publisher: Teledyne Technologies Inc.

Teledyne Technologies Inc., "New Release", "www.teledyne-controls.com/newscenter/sco.asp", 2007, pp. 1-2, Publisher: Teledyne Technologies Inc.

Avionica, "Securelink", http://www.avionica.com, Sep. 5, 2007, pp. 1-2, Publisher: Avionica.

Carlos Jodar et al., "Wi-Fi Gatelink Trial Frankfurt and Muich, Germany White Paper", Aug. 9, 2006, pp. 1-18, Publisher: Arinc Proprietary.

Eklund et al., "IEEE Standard 802.16: A Technical Overview of the Wirelessman Air Interface for Broadband Wireless Access", "IEEE Communications Magazine", Jun. 2002, pp. i-107, Publisher: IEEE.

Hardy et al., "Aircraft Network and File Server - Arinc 763", Oct. 16, 2002, pp. 1-12, Publisher: AEEC (Airlines Electronic Engineering Committee).

"Technical Overview for Mark III Communications Management Unit (CMU)", , pp. 1-59, Publisher: Honeywell Aerospace Electronic Systems, Jul. 2002.

\* cited by examiner

SYSTEM AND METHOD FOR WIRELESS ROUTING OF DATA FROM AN AIRCRAFT

BACKGROUND

Typical aircraft have onboard systems which communicate with systems on the ground during the course of a flight. For example, an ACARS system on the aircraft sends reports, such as flight plans, over a datalink. Most ACARS traffic occurs when the aircraft is at the gate. Various communication networks, such as satellite communications, VHF, HF, WiFi, or Cellular, can be used to transfer the data. Other systems also support transfer of data (e.g. engine performance data, and software upgrades) through other means such as manual transportation using removable disks (e.g. floppy disks, CDs, DVDs, etc.). Each means of data transfer has its own benefits and disadvantages.

For example, satellite communications are available both when on the ground and during flight. However, the recurring costs of satellite communications are much more expensive than other networks and the delivery rates (e.g. upload and download speeds) are much more restricted than the other networks. Similarly, although relatively inexpensive, the use of manual transportation using removable disks is less effective and more burdensome than other means. Although WiFi and Cellular networks are not available during flight, both offer improvements in cost and delivery rates over satellite communications as well as convenience and effectiveness over manual copying. Therefore, any improvements in establishing WiFi and Cellular networks can provide substantial benefits.

SUMMARY

The above-mentioned problems and other problems are resolved by the present invention and will be understood by reading and studying the following specification.

In one embodiment, an avionics communication system is provided. The avionics communication system comprises a wireless router located on an aircraft and configured to transceive wireless signals; and a processing unit located in the aircraft and configured to supply the wireless router with configuration parameters after determining it is time to connect to a ground network, the configuration parameters based on the location of the aircraft; wherein the wireless router uses the configuration parameters to establish a wireless connection with the ground network and route data from at least one client application on the aircraft to at least one ground application server.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

In accordance with common practice, the various described features are not drawn to scale but are drawn to emphasize specific features relevant to the present invention. Like reference numbers and designations in the various drawings indicate like elements.

DETAILED DESCRIPTION

Figure 1:
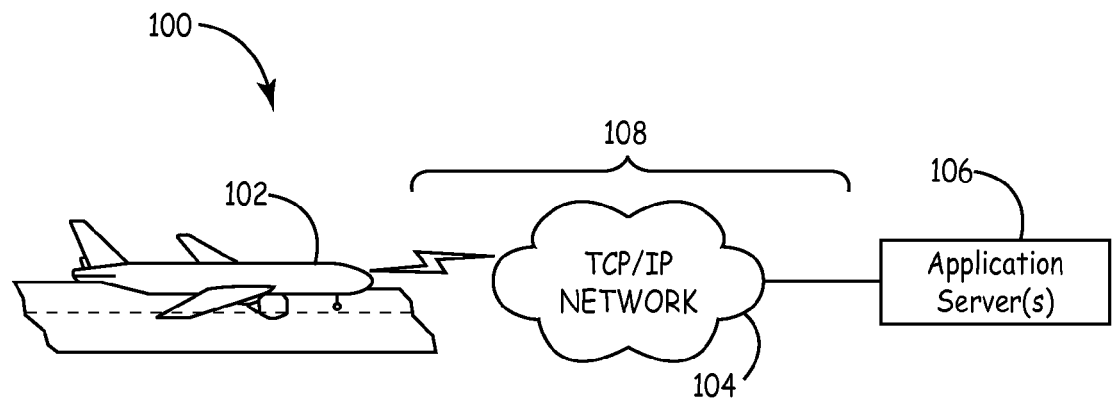
FIG. 1 is a diagram of a system environment for an avionics communication system according to embodiments of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

Embodiments of the present invention address the differences in ground networks from airport to airport, thereby enabling the automatic configuration of a wireless router on the aircraft such that the wireless router is able to connect to networks at different airports. In addition, placing a wireless IP router on the aircraft provides added security through the router's firewall. Thus, embodiments of the present invention improve aircraft datalink communications over subnetworks such as WiFi, Cellular, or other comparable communication subnetwork.

FIG. 1 is a diagram of a system environment 100 for an avionics communication system according to embodiments of the present invention. Environment 100 generally includes an aircraft 102, e.g., an aircraft of a commercial airline, that has landed at an airport. Aircraft 102 can establish communication with a suitable TCP/IP network 104. Network 104 may include the Internet, an airport local area network (LAN), and/or an airline's LAN or wide area network (WAN).

Aircraft 102 communicates with ground application server(s) 106 via a datalink 108 established over network 104. Although only one ground application server 106 is shown in FIG. 1 it is to be understood that in other embodiments, a plurality of application servers are used. In addition, each system on aircraft 102 does not have to communicate with the same ground application server. In some embodiments, ground application server(s) 106 is located at the same airport as aircraft 102. However, in other embodiments, ground application server(s) 106 is located remotely from the airport and services aircraft from multiple airports. To handle a fleet of aircraft, ground application server(s) 106 is configured to support a plurality of TCP/IP connections (e.g. one per aircraft). As used herein, a "TCP/IP datalink" is any communication link that can transport data in compliance with the TCP/IP suite of protocols. TCP/IP datalink 108 can include one or more components, including any number of wireless TCP/IP datalinks and any number of wired TCP/IP datalinks.

Figure 2:
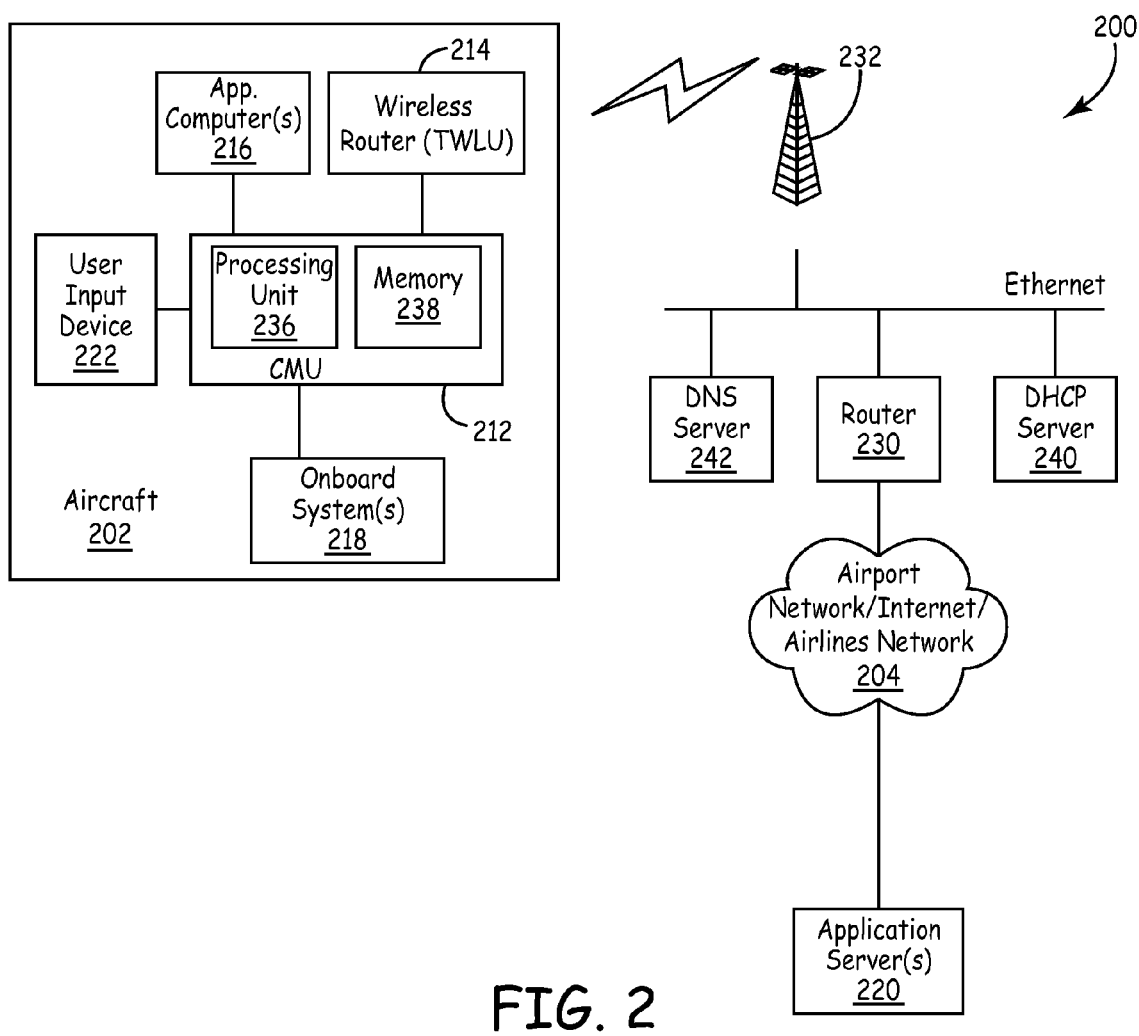
FIG. 2 is a block diagram of an avionics communication system according to one embodiment of the present invention.

FIG. 2 is a block diagram of one embodiment of an avionics communication system 200. Located on aircraft 202 is a communications management unit ("CMU") 212 and a terminal area wireless LAN unit ("TWLU") 214. CMU 212 is a line replaceable unit ("LRU") and includes processing logic that supports one or more aircraft communication functions, such as Aircraft Communications Addressing and Reporting System (ACARS) over IP messaging, Aeronautical Telecommunications Network (ATN) messaging, dataloading, and/or other data applications, such as for processing data from a Quick Access Recorder (QAR) or downloading Built-in Test Equipment (BITE) reports. In other embodiments, data applications are run on separate avionics computers such as application computer 216.

CMU 212 also processes and routes flight data from onboard system(s) 218 such as a flight management system (FMS), flight data acquisition and management system (FDAMS), and/or other related systems. CMU 212 processes the data received from the onboard system(s) 218 and prepares it for transmission via TWLU 214 to a corresponding ground application server(s) 220. Notably, although system 200 is discussed with respect to transmission from aircraft 202 to ground server(s) 220, it is to be understood that communication between aircraft 202 and ground server(s) 220 can be bi-directional.

A TWLU in a conventional avionics communication system is simply a transceiver, such as a radio frequency (RF) transceiver. However, TWLU 214 in embodiments of the present invention is a wireless internet protocol (IP) router which is configured for other functions in addition to transceiving wireless signals. Exemplary additional functions include, but are not limited to, network address translation (NAT), demilitarized zone (DMZ), and firewall services. In addition, TWLU 214 communicates with other ground routers, such as router 230, in updating and maintaining a routing table used in routing data from CMU 212. TWLU 214 in embodiments of the present invention adds the benefit of additional security and routing functions in addition to the routing functions of CMU 212.

However, in order to function as desired, TWLU 214 must be configured to work at each airport. Unfortunately, there exists ambiguity in the operation of the wireless network at each airport. Some airport authorities operate their own wireless networks, whereas some sell the rights to operate networks to third party companies (e.g. for passenger use in the terminal). Most airlines already operate their own private networks at the airport for booking and operations. Some airlines have taken the next step to extend them to wireless network such as 802.11 a/b/g.

Since there is no standard followed by each airport, TWLU 214 needs to be easily configured and adaptable to different airport environments in order to establish a wireless connection with a wireless communication device 232 on the ground. For example, some airport networks have static addresses while others have dynamically assigned addresses. TWLU needs to know which type of network is at each airport. Other variables include, but are not limited to, type of wireless connection (e.g. GPRS or WiFi), the service set identifier (SSID or network name), subnet mask, default gateway, and IP address of ground application server(s) 220 corresponding to the current airport. In addition, the firewall settings may need to be modified for each airport in order for a communication session to be established. For example, the firewall needs to be configured to allow communication over the ports and IP addresses corresponding to the current airport network. Hence, there are many variables which need to be configured in order for the wireless router TWLU 214 to function as desired at each airport. Since typical a TWLU in a conventional avionics communication system is simply a transceiver, many of these configuration requirements are not necessary.

In order to provide the proper configuration at each airport, embodiments of the present invention employ an Airport Gatelink Information (AGI) file to load TWLU 214 with airport specific configuration parameters based on the current airport location. The needed parameters vary depending on which type of wireless connection is used. Therefore, the AGI file includes fields for the network preference as well as timeout periods for each type of connection as shown below in Table 1. Notably, the parameters shown in Tables 1-7 below are provided by way of example and not by way of limitation. In particular, it is to be understood that other appropriate parameters can be used in other embodiments as indicated by the ellipsis at the end of each table.

TABLE 1

Wireless Connection Types

| Name | Type | Description |
| --- | --- | --- |
| NetworkPreference | Enum | WiFi, GPRS, WiFiPrimary |
| GPRSTimeout | Int | Value in seconds (0 . . . 300) |
| WiFiTimeout | Int | Value in seconds (0 . . . 300) |
| . . . | . . . | . . . |

TWLU 214 attempts to connect first to the preferred network type as indicated in the AGI file. When connecting using WiFi, the AGI file also includes fields to identify the network SSID and security info as indicated in Table 2 below.

TABLE 2

802.11 parameters

| Name | Type | Description |
| --- | --- | --- |
| SSID | AN text | Name of wireless to connect to. |
| 802.1xKey | Hex | Key used to Authenticate Wireless connection (160 bits) |
| RadiusServerAddr | IP Addr | Address of the Radius server needed for authentication |
| WPASecurity | Bool | A non-zero value signifies security is used |
| WiFiChannel | Int | Value 1-11 to select which channel to use. |
| . . . | . . . | . . . |

The IP layer of the network connection also differs depending upon which type of connection is used. When using WiFi to connect to the ground either static IP addressing or Dynamic Host Configuration Protocol (DHCP). If DHCP fails or static is specified in the AGI file, TWLU 214 attempts to use the static parameters. Table 3 below indicates exemplary IP layer parameters included in the AGI file.

TABLE 3

IP Parameters

| Name | Type | Description |
| --- | --- | --- |
| DHCP | Int | Is DHCP available (non-zero = Yes) |
| IPAddr | IP Addr | Static IP address to use |
| Gateway | IP Addr | Gateway for IP connection |
| DNS1 | IP Addr | Address for primary DNS server |
| DNS2 | IP Addr | Address for secondary DNS server |
| SubnetMask | IP Addr | Subnet for network |
| . . . | . . . | . . . |

If GPRS is used, necessary addresses are provided by the cellular network provider. However, if an airline switches cellular providers, a change is made to the AGI fields for username, password, and access point name (APN).

At the application layer, the parameters needed no longer differ between using a Cellular (e.g. GPRS) or WiFi network. Exemplary applications that connect to ground application server(s) 220 include, but are not limited to, ACARS messaging over Gatelink (AMG), Gatelink Dataloading Manager (GDLM) and Quick Access Recording function (QAR). The IP address of the ground application server(s) 220 may vary based on the current airport location. For example, one AMG ground application server may be used for all airports in New England, one for all airports on the western coast of the United States, and another for all airports in western Europe, etc. In order to establish the correct connection, the client applications on aircraft 102 need to have the correct IP address based on the current airport location.

AMG provides ACARS functionality over the network connection established by TWLU 214. An AMG client application, running on CMU 212 for example, connects to a corresponding ground application server(s) 220. The connection from the CMU to the ground application server is authenticated to prevent attacks, such as a malicious user employing a "man in the middle" attack. Hence, the AGI file includes fields for MG authentication information including the ground server application IP address or name as shown in Table 4.

TABLE 4

AMG Parameters

| Name | Type | Description |
| --- | --- | --- |
| AMGServerName | AN text | Could be hostname or IP address |
| AMGServerPort | Integer | Port number on server to use |
| AMGAuthenticationKey | Hex | 160 bit SHA key |
| ... | ... | ... |

The GDLM enables users to upload software packages to CMU 212 through the wireless connection. On CMU 212, a technician can then Dataload onboard LRUs via emulation of a portable dataloader. Connection to the ground GDLM server is also authenticated in some embodiments. The AGI file includes authentication information for the GDLM connection as indicated in Table 5.

TABLE 5

GDLM Parameters

| Name | Type | Description |
| --- | --- | --- |
| GDLMServerName | AN text | Could be hostname or IP address |
| GDLMServerPort | Integer | Port number on server to use |
| GDLMAuthenticationKey | Hex | 160 bit SHA key |
| ... | ... | ... |

The QAR application receives engine performance data from one or more sensors. Typically, the QAR application records engine performance data on a removable storage medium (e.g. CD or floppy disk) which is then manually removed and carried to a remote location for downloading. However, embodiments of the present invention enable the QAR application to send recordings to a corresponding ground QAR server via the datalink. The QAR ground application server evaluates the recording for events indicating significant deviation from normal operational parameters. By periodically evaluating the recordings, problems can be detected prior to an accident. The AGI file also includes authentication information for the QAR connection as indicated in Table 6.

TABLE 6

QAR Parameters

| Name | Type | Description |
| --- | --- | --- |
| QARServerName | AN text | Could be hostname or IP address |
| QARServerPort | Integer | Port number on server to use |
| QARAuthenticationKey | Hex | 160 bit SHA key |
| ... | ... | ... |

In some embodiments, the AGI file is implanted in a relational database. In other embodiments, the AGI file is implemented as a comma separated value (CSV) file. The start of each line contains data, such as the Airport Code, indicating the airport. The end of an airport record is delimited by a carriage return line feed (CRLF) character to indicate the end of the file. At the beginning of an AGI database there is also a field to enter the version number and a 32-bit cyclic redundancy check (CRC) at the end of the file. The AGI database includes a CSV file for at least each airport in the aircraft's travel plan. Table 7 provides an exemplary order in which the parameters appear in the file.

TABLE 7

AGI file format (per airport)

| Name | Type | Description |
| --- | --- | --- |
| AirportCode | AN text | Airport Code |
| NetworkPreference | Enum | WiFi, GPRS, GPRSPrimary |
| GPRSTimeout | Int | Value in seconds (0 ... 300) |
| WiFiTimeout | Int | Value in seconds (0 ... 300) |
| SSID | AN text | Name of wireless to connect to. |
| 802.1xKey | Hex | Key used to Authenticate Wireless connection (160 bits) |
| RadiusServerAddr | IP Addr | Address of the Radius server needed for authentication |
| WPASecurity | Int | A non-zero value signifies security is used |
| WiFiChannel | Int | Value 1-11 to select which channel to use. |
| DHCP | Int | Is DHCP available (non-zero = Yes) |
| IPAddr | IP Addr | Static IP address to use |
| Gateway | IP Addr | Gateway for IP connection |
| DNS1 | IP Addr | Address for primary DNS server |
| DNS2 | IP Addr | Address for secondary DNS server |
| SubnetMask | IP Addr | Subnet mask for network |
| AMGServerName | AN text | Could be hostname or IP address |
| AMGServerPort | Int | Port number on server to use |
| AMGAuthenticationKey | Hex | 160 bit SHA key |
| GDLMServerName | AN text | Could be hostname or IP address |
| GDLMServerPort | Int | Port number on server to use |
| GDLMAuthenticationKey | Hex | 160 bit SHA key |
| QARServerName | AN text | Could be hostname or IP address |
| QARServerPort | Int | Port number on server to use |
| QARAuthenticationKey | Hex | 160 bit SHA key |
| ... | ... | ... |

In operation, CMU 212 communicates with TWLU 214 over cable 234. In this example, CMU 212 and TWLU 214 communicate using an Ethernet standard such as 10Base-T to provide TWLU 214 with configuration parameters from the AGI file based on the current airport location. CMU 212 determines which airport the aircraft is at based on data received from an FMS in some embodiments. In other embodiments, a user input device 222 is used which enables a user, such as a member of the flight crew, to enter the airport location. The data provided to TWLU 214 enables TWLU 214 to initialize and maintain the wireless connection. In addition, CMU 212 provides the application connection data information to the corresponding client applications on aircraft 202. The application connection data enables client applications on aircraft 202 to establish and maintain a connection with a corresponding ground application.

CMU 212 includes a processing unit 236 and a memory 238. Memory 238 includes any type of suitable medium such as floppy disks, conventional hard disks, CD-ROM, flash memory ROM, nonvolatile ROM, RAM, or other suitable medium. The configuration parameters are stored in memory 238 as a CSV file in some embodiments and as a relational database in others.

Processing unit 236 includes or functions with software programs, firmware or other computer readable instructions for carrying out various methods, process tasks, calculations, and control functions, used in configuring TWLU 214 per airport as described in the present specification. These instructions are typically tangibly embodied on any appropriate medium used for storage of computer readable instructions or data structures. Such computer readable media includes any available media that can be accessed by a general purpose or special purpose computer or processing unit, or any programmable logic device.

Suitable computer readable media comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

TWLU 214 uses the configuration parameters received from CMU 212 in establishing a wireless connection with ground wireless connection device 232. In some embodiments, ground wireless connection device 232 is a wireless access point (WAP) configured according to a known wireless protocol such as IEEE 802.11 a, b, g, n or other suitable wireless protocol such as WiMax. In other embodiments, ground wireless connection device 232 is an antenna for cellular communication such as, but not limited to, GPRS. In dynamic networks, TWLU 214 requests an IP address and other necessary configurations from a DHCP server 240 and uses Domain Name Service (DNS) server 242 to resolve addresses.

Once the wireless connection is established and an IP address assigned, if necessary, client applications on aircraft 202 connect to the corresponding ground application servers using the authentication parameters and TCP/IP connection information based on the current airport location. In this embodiment, the authentication parameters and network connection information is supplied by CMU 212. However, it is to be understood, that in other embodiments, a separate processing unit is used to determine when to connect to the ground network and to pass appropriate configuration parameters to TWLU 214 and client applications on aircraft 202.

TWLU 214 routes data from the client applications to the ground application servers via ground router(s) 230 and network(s) 204. Network 204 can be an airlines WLAN, airport WAN and/or the Internet. Once the CMU 212 determines that it is time to terminate the wireless connection to the ground network, it signals to TWLU 214 to end the wireless connection. Operation of the avionics communication system is described further with respect to FIGS. 3 and 4.

Figure 3:
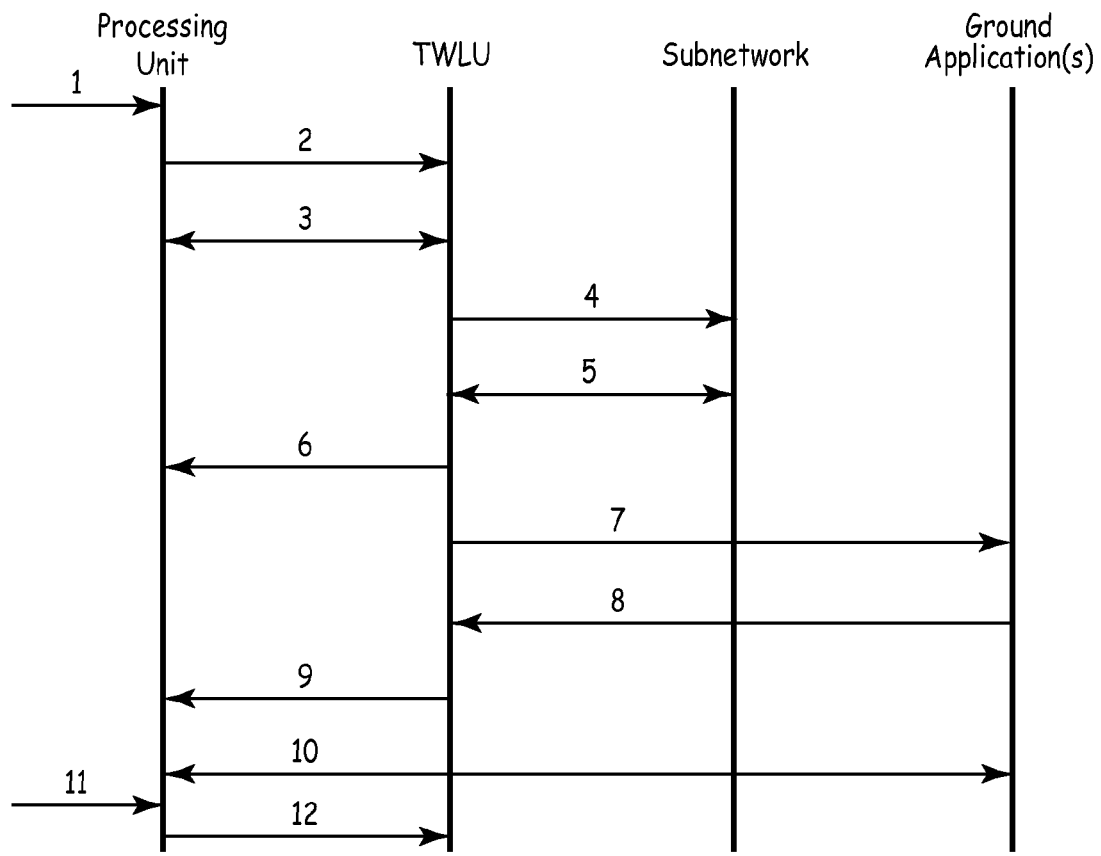
FIG. 3 is a message sequence diagram that depicts an example sequence handled by an avionics communication system according to one embodiment of the present invention.

FIG. 3 is a message sequence diagram that depicts an example sequence 300 handled by an avionics communication system according to one embodiment of the present invention. In FIG. 3, time progresses vertically from top to bottom. Arrow 1 represents information sent to the CMU which indicates the aircraft has landed and the current airport. Arrow 2 represents a signal sent from the CMU to turn on the TWLU. Arrow 3 represents bidirectional information communicated between the CMU and the TWLU to initialize the TWLU with configuration and security parameters. As stated above, although FIG. 3 is described with respect to a CMU, it is to be understood that in other embodiments a separate processing unit is used to select and pass configuration data to a TWLU.

Once the TWLU is initialized with the configuration and security parameters specific to the current airport location, the TWLU establishes a wireless connection with a ground communication device as represented by arrow 4. The ground communication device is a WAP in some embodiments and a cellular antenna in others. Arrow 5 represents the bidirectional exchange of security parameters between the ground communication device and the TWLU to authenticate the TWLU. Once authenticated, the TWLU sends a signal, such as an SNMP trap, to notify the CMU that the wireless connection has been established as represented by arrow 6.

If the current airport network dynamically assigns IP addresses, the TWLU then sends a request, represented by arrow 7, for networking parameters (e.g. IP address, subnet mask, etc.) to a DHCP server on the ground. Arrow 8 represents the response or ACK of the DHCP server with the requested network parameters. Arrow 9 represents another notification, such as another SNMP trap, to indicate to the CMU that the wireless connection is ready for application connections/traffic. Upon receiving the notification that the wireless connection is ready for application connections, applications run on the CMU (or other application computer on the aircraft) establish TCP/IP connections with ground application servers and exchange data as represented by arrow 10. The data exchanged can include, but is not limited to, engine performance data, flight plans, configuration and security data for the next airport in the flight plan, firmware and software updates, etc.

Arrow 11 represents a signal received by the CMU indicating that it is time for the aircraft to end the wireless connection. Exemplary events which can indicate it is time for the aircraft to end the wireless connection include, but are not limited to the wireless signal strength falling below a threshold level, proximity detectors indicating the aircraft is no longer at the gate, or other sensors indicating the aircraft is no longer at the airport or on the ground. Once the CMU receives the notification that the aircraft is to terminate the wireless connection, it sends a signal, represented by arrow 12, which causes TWLU to terminate the wireless connection.

Figure 4:
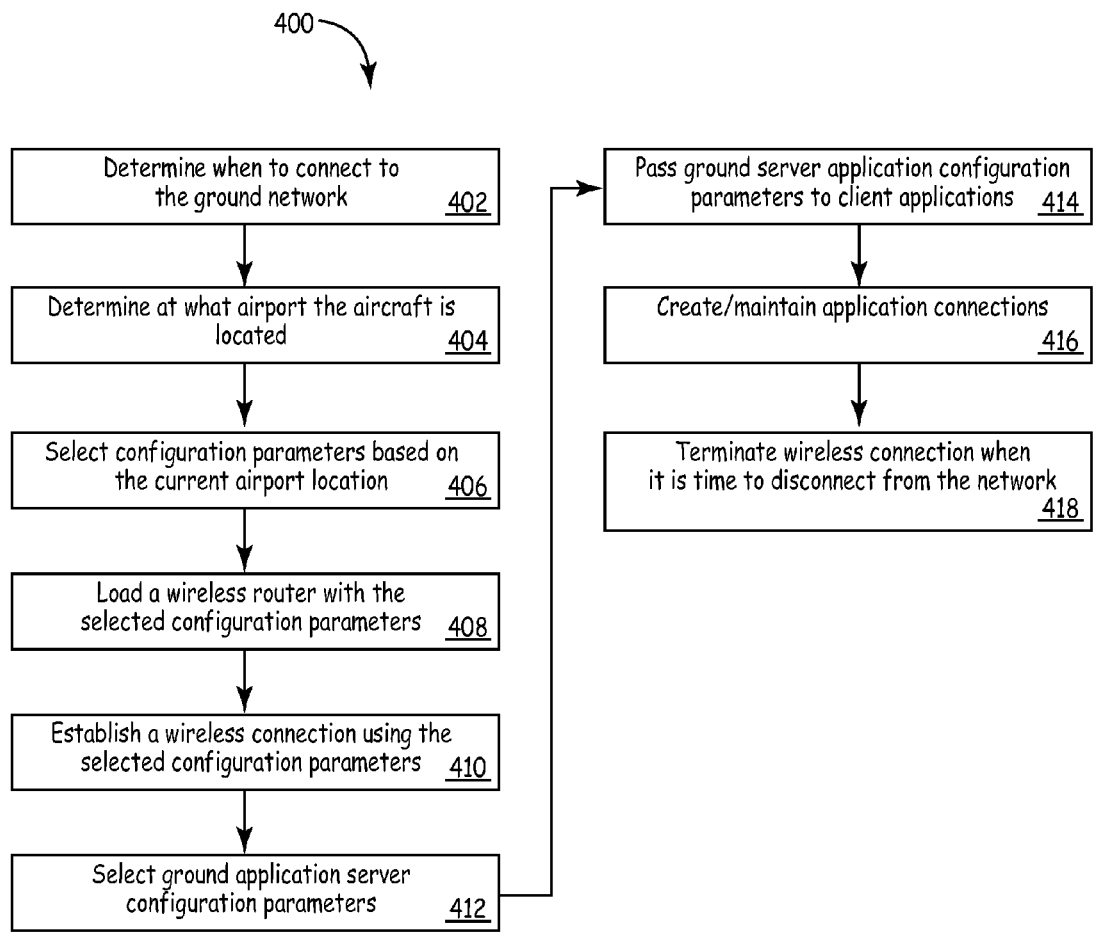
FIG. 4 is a flow chart depicting a method of wirelessly routing data from an aircraft according to one embodiment of the present invention.

FIG. 4 is a flow chart depicting a method 400 of wirelessly routing data from an aircraft according to one embodiment of the present invention. Method 400 can be implemented in an avionics communication system such as system 200 described above. It is to be understood that At 402, a processing unit (e.g. CMU 212 above) determines that it is time to connect to the ground network. The determination can be based on various events or sensors. For example, the determination can be based on one or more of the speed of the aircraft, a comparison of the altitude of the aircraft with the altitude of the airport, detecting a wireless signal strength above a required threshold, detecting the proximity of the aircraft to a gate, etc. In addition, in other embodiments, a user input device (e.g. user input device 222) is used for a member of the flight crew to indicate when to connect to the ground network. At 404, the processing unit determines at what airport the aircraft is located. This determination is based on data received from a FMS in some embodiments. In other embodiments, the determination is based on other data or on an input form a user input device.

Once the processing unit has determined that it is time to connect to a ground network and at what airport the aircraft is located, the processing unit selects configuration parameters based on the current airport location at 406. The configuration parameters include configuration parameters discussed above, such as network preference, network timeout, security key, and network SSID. At 408, the processing unit loads a wireless router (e.g. TWLU 214) with the selected configuration parameters.

At 410, after being configured with the selected configuration parameters, the wireless router establishes a wireless connection with a wireless communication device (e.g. wireless communication device 232) using the loaded configuration parameters. Establishing a wireless connections comprises establishing a connection according to a communication protocol, such as but not limited to, one of the General Packet Radio Service (GPRS) standard, IEEE 802.11a standard, IEEE 802.11b standard, and IEEE 802.11g standard. At 412, the processing unit selects ground application server configuration parameters based on the current airport location. The ground application server configuration parameters are parameters enabling client applications running on the aircraft to connect and authenticate to the correct application server as described above. At 414, the selected ground application server configuration parameters are passed to the corresponding client applications.

At 416, connections between client application on the aircraft and the ground application servers are created and maintained via the wireless router. At 418, the established wireless connection is terminated once it is determined that it is time to disconnect from the network. For example, in one embodiment the FMS sends data to the processing unit indicating the aircraft has taken off and the processing unit sends a signal to the wireless router instructing the wireless router to terminate the established wireless connection. Other events which indicate that it is time to terminate the wireless connection include, but are not limited to, the wireless signal strength falling below a threshold level, proximity detectors indicating the aircraft is no longer at the gate, or other sensors indicating the aircraft is no longer at the airport or on the ground.

Hence, embodiments of the present invention enable additional security and routing function through the use of a wireless router. In addition, configuration of the wireless router is performed automatically to adjust to the settings of each airport in the aircraft's flight plan. Therefore, the added functionality does not require additional input from a pilot or ground crewmember.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An avionics communication system comprising:
   a wireless router located on an aircraft and configured to transceive wireless signals; and
   a processing unit located in the aircraft and configured to supply the wireless router with configuration parameters after determining it is time to connect to a ground network, the configuration parameters based on the location of the aircraft;
   wherein the wireless router uses the configuration parameters to establish a wireless connection with the ground network and route data from at least one client application on the aircraft to at least one ground application server.

2. The avionics communication system of claim 1, wherein the at least one client application comprises an application processing one of Aircraft Communications Addressing and Reporting System (ACARS) messaging, Aeronautical Telecommunications Network (ATN) messaging, Quick Access Recorder (QAR) data, dataloading functions, and Built-in Test Equipment (BITE) data.

3. The avionics communication system of claim 1, further comprising at least one of a flight management system (FMS) and a user input device, wherein each of the FMS and user input device provides data to the processing unit indicating the airport where the aircraft is located.

4. The avionics communication system of claim 1, wherein the configuration parameters include one or more of network preference, network timeout, network SSID, and network security key.

5. The avionics communication system of claim 1, wherein the processing unit is configured to supply the at least one client application on the aircraft with ground application server configuration parameters based on the airport where the aircraft is located.

6. The avionics communication system of claim 5, wherein the ground application server configuration parameters include one or more of the ground application server address, port number, and authentication key.

7. The avionics communication system of claim 1, wherein the wireless router is configured to transceiver wireless signals formatted according to one of General Packet Radio Service (GPRS), IEEE 802.11a, IEEE 802.11b, and IEEE 802.11g.

8. A method of communicating with a ground application server from an aircraft, the method comprising:
   determining when to connect to a ground network;
   when it is time to connect to the ground network, selecting configuration parameters based on the airport where the aircraft is located;
   loading a wireless router located on the aircraft with the selected configuration parameters; and
   establishing a wireless connection between the wireless router and a wireless communication device using the loaded configuration parameters.

9. The method of claim 8, wherein determining when to connect to a ground network comprises one of detecting proximity of the aircraft to a gate, and comparing the strength of a desired wireless signal to a threshold.

10. The method of claim 8, wherein determining when to connect to a ground network comprises one of evaluating the speed of the aircraft, and comparing the altitude of the aircraft with the altitude of the airport.

11. The method of claim 8, wherein selecting configuration parameters comprises selecting at least one of network preference, network timeout, security key, and network SSID.

12. The method of claim 8, wherein establishing a wireless connection comprises establishing a wireless connection according to one of the General Packet Radio Service (GPRS) standard, IEEE 802.11a standard, IEEE 802.11b standard, IEEE 802.11g standard, IEEE 802.11n standard, and WiMax.

13. The method of claim 8, further comprising selecting ground application server configuration parameters based on the airport where the aircraft is located and passing the selected ground application server configuration parameters to at least one client application running on the aircraft.

14. The method of claim 8, further comprising determining when to terminate the established wireless connection based on one of the proximity of the aircraft to a gate, and a comparison of the wireless signal strength to a threshold.

15. A program product comprising program instructions embodied on a processor-readable medium for execution by a programmable processor, wherein the program instructions are operable to cause the programmable processor to:
  determine when to connect to a ground network;
  retrieve configuration parameters based on the airport at which the aircraft is located;
  output the retrieved configuration parameters to a wireless router on the aircraft;
  receive a signal indicating the wireless router has established a wireless connection with a wireless communication device on the ground; and
  output data to at least one ground application server over the established wireless connection after the signal is received from the wireless router.

16. The program product of claim 15, wherein the program instructions are further operable to determine when to connect to the ground network based on the proximity of the aircraft to a gate at the airport, and a comparison of the wireless signal strength to a threshold.

17. The program product of claim 15, wherein the program instructions are operable to retrieve configuration parameters comprising at least one of network preference, network timeout, security key, and network SSID.

18. The program product of claim 15, wherein the program instructions are further operable to retrieve ground application server configuration parameters based on the airport where the aircraft is located and pass the retrieved application server configuration parameters to one or more client applications on the aircraft.

19. The program product of claim 15, wherein the program instructions are further operable to format data as TCP/IP data packets to be output to the at least one ground application server over the established wireless connection.

20. The program product of claim 15, wherein the program instructions are further operable to determine when to terminate the wireless connection.

\* \* \* \* \*